United States Patent
Puukko et al.

(10) Patent No.: US 9,382,436 B2
(45) Date of Patent: Jul. 5, 2016

(54) METHOD FOR SURFACE MODIFICATION OF A BODY

(75) Inventors: Pasi Puukko, Espoo (FI); Laura Kela, Espoo (FI); Anu Ilmonen, Espoo (FI)

(73) Assignee: Teknologian Tutkimuskeskus VTT (FI)

( * ) Notice: Subject to any disclaimer, the term of this patent is extended or adjusted under 35 U.S.C. 154(b) by 0 days.

(21) Appl. No.: 14/115,373

(22) PCT Filed: May 7, 2012

(86) PCT No.: PCT/FI2012/050438
§ 371 (c)(1),
(2), (4) Date: Dec. 10, 2013

(87) PCT Pub. No.: WO2012/150383
PCT Pub. Date: Nov. 8, 2012

(65) Prior Publication Data
US 2014/0093648 A1    Apr. 3, 2014

(30) Foreign Application Priority Data
May 5, 2011   (FI) ..................................... 20115424

(51) Int. Cl.
*C09D 11/30* (2014.01)
*B41M 5/52* (2006.01)
(Continued)

(52) U.S. Cl.
CPC     *C09D 11/30* (2013.01); *B05D 7/24* (2013.01); *B41M 5/5236* (2013.01); *C09D 11/03* (2013.01); *C09D 11/14* (2013.01); *C09D 11/38* (2013.01); *B41M 5/0017* (2013.01)

(58) Field of Classification Search
CPC ..................................................... C09D 11/30
See application file for complete search history.

(56) References Cited

U.S. PATENT DOCUMENTS

| 4,374,702 A | 2/1983 | Turbak et al. |
| 4,481,076 A | 11/1984 | Herrick |

(Continued)

FOREIGN PATENT DOCUMENTS

| EP | 1957589 | 8/2008 |
| EP | 2055949 | 5/2009 |

(Continued)

OTHER PUBLICATIONS

Hamada et al.; Nanofibrillated cellulose as a coating agent to improve print quality of synthetic fiber sheets; TAPPI Journal; Nov. 2010; pp. 25-29; vol. 9 No. 11; TAPPI.

(Continued)

*Primary Examiner* — Nathan T Leong (57) ABSTRACT

The invention concerns a method for modification of the surface of a body, especially a film-shaped body, wherein a fiber-containing substance comprising nano-sized polysaccharide fiber particles is dispersed in a medium essentially composed of water and a polar solvent to form a suspension. The suspension is applied on the surface by a printing method. According to the invention, the viscosity of the suspension is adjusted to a range that is suitable for the printing method by adjusting the fiber concentration of the suspension. The invention concerns also a composition disposable onto the surface of a body, such as a film-shaped body, by a non-contact inkjet printing method. According to the invention, the composition comprises nanocellulose fibers suspended in a medium essentially composed of water and a polar solvent, miscible with water, wherein the concentration of nanocellulose fibers is 0.5 to 1.5%, preferably 0.5 to 1%, most preferably about 0.7% of said composition.

12 Claims, 4 Drawing Sheets

(51) Int. Cl.
*C09D 11/03* (2014.01)
*C09D 11/14* (2006.01)
*C09D 11/38* (2014.01)
*B05D 7/24* (2006.01)
*B41M 5/00* (2006.01)

(56) References Cited

U.S. PATENT DOCUMENTS

| | | | |
|---|---|---|---|
| 5,618,338 | A | 4/1997 | Kurabayashi et al. |
| 5,637,197 | A | 6/1997 | Watt et al. |
| 6,357,868 | B1 | 3/2002 | Pfaff |
| 6,726,756 | B1 | 4/2004 | Zou et al. |
| 2003/0062510 | A1* | 4/2003 | Van den Bogaert .......... 252/500 |
| 2004/0226671 | A1 | 11/2004 | Nguyen et al. |
| 2007/0110907 | A1 | 5/2007 | Brown |
| 2009/0181478 | A1 | 7/2009 | Cox et al. |
| 2009/0294080 | A1* | 12/2009 | Honnorat ...................... 162/110 |

FOREIGN PATENT DOCUMENTS

| | | |
|---|---|---|
| JP | S61-136534 | 6/1986 |
| JP | H10-095803 | 4/1998 |
| JP | H11-226467 | 8/1999 |
| JP | 2003/026962 A | 1/2003 |
| JP | 2003/073594 A | 3/2003 |
| JP | 2003073594 * | 3/2003 |
| JP | 2005/096383 | 4/2005 |
| JP | 2006/247971 | 9/2006 |
| JP | 2010/090486 | 4/2010 |
| WO | WO 00/47628 A2 | 8/2000 |
| WO | WO 2007/021377 A2 | 2/2007 |
| WO | WO 2007/088974 | 8/2007 |

OTHER PUBLICATIONS

Klemm et al.; Nanocelluloses as innovative polymers in research and application; Advances in Polymer Science; 2006; pp. 49-96; vol. 205.

* cited by examiner

METHOD FOR SURFACE MODIFICATION OF A BODY

BACKGROUND OF THE INVENTION

1. Field of the Invention

This invention concerns a method for modification of the surface of a body, especially a film-shaped body, wherein a fibre-containing substance comprising nano-sized polysaccharide fibre particles is dispersed in a medium essentially composed of water and a polar solvent to form a suspension, wherein said suspension is applied onto said surface by a printing method. The invention concerns also a product comprising such a fibre-containing substance, dispersed in a medium and suitable for disposing by the inkjet printing method.

2. Description of Related Art

Nanocellulose is a polymeric substance composed of nano-sized cellulose fibres (nanofibres) where the nanofiber structuring determines the properties of the product. Due to the extraordinary supramolecular structure and exceptional product characteristics, nanocelluloses have received increasing attention. Nanocellulose is proposed for use in a great variety of technical fields. For a review, see D. Klemm et al., "Nanocelluloses as innovative polymers in research and application", Advances in Polymer Science, 2006, vol. 205 pp. 49-96.

The inkjet printing technique is a non-contact printing method meaning that the printhead and the substrate (the sheet to be printed) are not in contact with each other during the printing process. The principle of inkjet printing is to transfer separate ink drops through small nozzles to a defined area on the substrate to be printed.

This technique enables printing of all kinds of substrates. Thus rigid and flexible as well as smooth and uneven substrates can be used. Suitable substrates are for example paper, board, plastic, wood, etc.

The inkjet printing technique is very widely used and described in many patent publications. For example, U.S. Pat. No. 6,726,756 and EP 1 957 589 describe inkjet ink formulations incorporating cellulose derivatives as binding agents. U.S. Pat. No. 6,357,868 describes ink formulations comprising cellulose derivatives for use in coating of paper substrates. In all these patents, the role of the cellulose derivatives is to act as binding agents for the pigments.

EP 2 055 949 describes an inkjet method where an organic polymer is applied onto a substrate of paper or the like in order to create a security marker thereon.

The published US patent application US 2009/181478 describes disposing of a nanosized material by inkjet application onto a tape.

SUMMARY OF THE INVENTION

An object of the present invention is to provide a method for modification of the surface of a body in order to affect the properties of the surface, and/or affect the properties of the body material beneath the surface.

A particular object is to affect the surface of sheets such as paper, board or transparency films, preferably to change the surface energy, polarity, print gloss, or opacity thereof, especially in order to facilitate the printability properties thereof.

Another object is to improve the strength properties of the sheet, particularly to increase the bending resistance, to increase the tear strength, tensile strength or burst strength of the sheet.

Thus, according to one aspect, this invention concerns a method for modification of the surface of a body, especially a film-shaped body, wherein a fibre-containing substance comprising nano-sized polysaccharide fibre particles is dispersed in a medium essentially composed of water and a polar solvent to form a suspension, wherein said suspension is applied on said surface by a printing method.

According to the invention, the viscosity of the suspension is adjusted to a range that is suitable for said printing method by adjusting the fibre concentration of the suspension.

In another aspect, this invention concerns a composition disposable onto the surface of a body, such as a film-shaped body, by a non-contact inkjet printing method, typically a digital inkjet printing method. According to this invention, the composition comprises nanocellulose fibres suspended in a medium essentially composed of water and a polar solvent, miscible with water, wherein the concentration of nanocellulose fibres is 0.5 to 1.5%, preferably 0.5 to 1%, most preferably about 0.7% of said composition.

DETAILED DESCRIPTION OF PREFERRED EMBODIMENT

The term "non-contact method" for disposing the fibre-containing substance onto the surface refers particularly to an inkjet printing method, preferably a digital inkjet printing method, although also other non-contact disposing methods are included.

An essential feature of all these non-contact methods is that the material to be disposed is forced through nozzles in a head (such as print-head with nozzles) onto the surface either as a continuous stream or, as in inkjet printing, as small drops or droplets. It is essential that the head and the surface to be treated do not touch each other during the process. The principle of inkjet printing is to transfer the inkjettable fluid drops through the nozzles in the print-head to a defined place on a printing substrate. The fluid dots form a matrix on the substrate.

Alternatively, the printing method is a flexographic printing method.

The terms "ink" and "inkjettable fluid", or even shortened "fluid", are used interchangeably in the present context to designate a fluid composition which contains nano-sized polysaccharide fibres, especially nanocellulose, and which can be applied by a non-contact method, in particular by the "inkjet" method, or alternatively, by a flexographic printing method.

In the present context, the ink, especially the inkjettable fluid, is formulated to various physicochemical demands of the specific method of application (e.g. the printhead of the applicator) and depending on the actual technique used for applying the composition, as will be explained in more detail below. Typically, the fluid is formulated such as to have good latency, proper rheological properties and suitable surface tension. To prevent clogging of any nozzles used in the applicator, the particle size of the solid material (e.g. nanocellulose) needs to be smaller than about 1/100 of the diameter of the orifices of the nozzles.

As known in the art, the main components of conventional inks, such as inkjet fluids are the colorant (pigments or dyes) and the carrier phase. In the present context, a major component of the fluid is formed by a nano-sized fibre-containing substance. Naturally, conventional components of inkjet fluids can be used in combination therewith, e.g. for marking the treated areas.

In the present invention, the inkjet technique is applied onto disposing of a fibre-containing substance onto a surface. The term "fibre-containing substance" refers particularly to nano-sized polysaccharide fibres such as nanocellulose or nano-sized hemicellulose.

The term "nano-sized fibre" refers to fibres with a thickness less than 100 nm, preferably from about 10 nm, in particular about 30-60 nm, and a length below 2000 nm, preferably from 10 nm to 2000 nm, in particular about 200-1500 nm, in one embodiment 250-1200 nm, in another one 200-1000 nm and in a third one shorter than 250 nm. Accordingly, "nanocellulose" refers to cellulose fibres with a thickness less than 100 nm, preferably about 10 to 100 nm, in particular 30-60 nm, and a length below 2000 nm, for example 200-1500 nm, for instance 250-1200 nm, 200-1000 nm, or shorter than 250 nm.

A particularly interesting fibrous matter comprises nanofibres of a length of less than 250 nm (known as "NCC/whiskers").

For use in the present invention, it is of importance that the nanocellulose fibres or other fibres do not clog the nozzles of the head disposing the material. Therefore it is desirable to have fibres of uniform size. Furthermore, it may also be advisable to remove oversized fibres and other particles by centrifuging or otherwise.

The medium into which the fibre-containing substance is dispersed to form a suspension, is a medium essentially composed of water or a mixture of water and at least one organic solvent, preferably a polar solvent. In one embodiment, at least 20% of the medium is water. The remaining portion of the medium is a polar organic solvent, one or more, miscible with water. Combinations or mixtures of polar solvents, optionally and preferably in mixture with water, are particularly preferred.

As preferred polar solvents can be mentioned glycols, particularly polyethylene glycol (PEG) or ethylene glycol (EG) and mixtures thereof, and alcohols, such as isopropyl alcohol and similar lower alkyl alcohols, and mixtures thereof.

According to an embodiment, glycols and alcohols are used in a weight ratio of 1 to 100 to 100 to 1, preferably 10-100 to 100-10. Generally, with several solvents, mixtures are employed in which each solvent, irrespective of the other solvent(s), is present in a concentration of 1 to 100, preferably 10 to 100 parts by weight, i.e. for three solvents: A: 1 to 100, preferably 10 to 100 parts by weight, B: 1 to 100, preferably 10 to 100 parts by weight and C: 1 to 100, preferably 10 to 100 parts by weight.

The fibre material forms an aqueous suspension comprising a non-settling fibre, such as a polysaccharide, particularly a nanocellulose, in water, preferably in combination with a polar solvent miscible with water.

As will appear from the examples particularly good results have been obtained with solvent mixtures, in particular mixtures containing 2 to 4 miscible solvents, in particular together with water.

The "suspension" according to this invention may be a colloidal suspension or a suspension of coarser particles or even an ideal solution of very small particles. In most cases the "suspension" is a mixture of these forms. The term "suspension" is herein used to include all these forms.

The suspension is considered to be non-settling if, upon standing at room temperature for at least 24 hours, less than 10 wt-% of the total amount of solids of the suspension is precipitated or settled out.

The surface tension of the suspension is preferably 20-60 mN/m, more preferably about 30 mN/m for inkjet printing and about 40 mN/m for flexographic printing.

Surface active agents, particularly non-ionic surfactants, may be added so as to adjust the surface tension of the suspension and to prevent flocculation of the fibres in the suspension. Also other components, such as biocides and buffering agents may be added.

A proper viscosity of the suspension is of great importance. The viscosity is influenced by the concentration of the nano-sized polysaccharide fibres, the kind of nano-sized polysaccharide fibres, the components of the medium used in the suspension. The different printing methods have slightly different requirements with respect to viscosity. In practice, it is most convenient to adjust the viscosity of the suspension to a value or range that is suitable for the printing method to be used by adjusting the fibre concentration of the suspension.

Generally, the (dynamic) viscosity of the suspension is 5-200 mPas. For inkjet printing, the viscosity is preferably 5-40 mPas, more preferably 5-30 mPas or 5-20 mPas, in particular 8-20 mPas. Because the fibre suspension is a so called non-Newtonian fluid, these viscosity values are valid at a share rate higher than 5 $s^{-1}$. For flexographic printing, a particularly suitable viscosity range is 10 to 200 mPas, more preferably 30 to 70 mPas.

The body, the surface of which shall be modified according to this invention, is particularly a film-shaped body, which means that it has a thickness much less than the other dimensions (length and breath). The film-shaped body is either a continuous web, or alternatively, a sheet cut into a desired form and size before the fibre-containing substance is brought onto its surface.

The film-shaped body may be a fibre-containing sheet, as a sheet of wood, paper, board, or a transparency film, or a sheet made of a non-fibrous material, such as plastic, metal, glass, and the like.

The surface of the sheet is modified to increase the strength properties or printability, for example by creating opaque areas at desired places of the sheet.

The fibre-containing substance is disposed onto one or more pre-determined area(s) on the surface of the body, optionally as several layers. The pre-determined area(s) can be comprised of discrete areas forming a limited part of the total surface of the body. Typically, the discrete areas onto which the fibre-containing substance is disposed form less than 75%, in particular less than 50%, typically about 0.01 to 25% of the total area of the body surface.

In the inkjet printing method, the fibre-containing suspension is disposed onto the surface as droplets of the liquid phase, wherein the droplets are essentially uniform in size or of variable size.

A composition disposable onto the surface of a body, such as a film-shaped body, by a non-contact inkjet printing method, comprises nanocellulose fibres suspended in a medium essentially composed of water and at least one polar solvent, typically a combination of two or more polar solvents, miscible with water, wherein the concentration of nanocellulose fibres is 0.5 to 1.5%, preferably 0.5 to 1.0%, most preferably about 0.7% of said composition.

At least 20% of the medium into which the fibres are suspended is water and that the remaining portion of the medium is a polar organic solvent miscible with water. The polar solvent comprises preferably a glycol such as ethylene glycol (EG) and/or polyethylene glycol (PEG) and optionally also an alcohol such as isopropyl alcohol. The surface tension of the composition is 20-60 mN/m, preferably about 30-40 mN/m.

The suspension is preferably stabilized by the addition of a surfactant, preferably a non-ionic surfactant. The suspension may also include biocides, buffering agents, etc.

All the percentage data presented in this document are weight-%.

The invention will be illuminated by the following non-restrictive examples.

EXAMPLES

One object of the experiments was to test the effect of disposing of an aqueous nanocellulose suspension onto sheets of paper, board or transparency with respect to surface energy, polarity, surface strength, bending resistance and print gloss. Another object was to study the effect of addition of various polar solvents to aqueous suspensions of nanocellulose with respect to viscosity and surface tension of the mixtures obtained. A third object was to prepare inkjettable fluid formulations (in the following also shortened to "ink formulations") useful for inkjet printing, based on mixtures of the aqueous nanocellulose suspensions and solvent mixtures of polar solvents and water, and to test the printability of these ink formulations.

Example 1

Starting Material (NDC) in the Experiments

Nanocellulose is commercially available as nanodisperse cellulose (NDC) which is a gel like product of 10% nanocellulose dispersed in water. The average fibre length of the nanocellulose used was about 1000 nm. The thickness of the fibre was less than 100 nm, about 50 nm in average. A study by scanning electronic microscope (SEM) showed that the NDC contained short, rod like cellulose particles of rather large size distribution.

Example 2

Effect of NDC Coating on Sheets of Paper, Board and Transparency

The commercial NDC gel, which contains about 10% of nanocellulose, was diluted in water to give two suspensions containing 1.5 and 3%, respectively, of nanocellulose (although these suspensions are transparent and may look like solutions, they are suspensions rather than ideal solutions; therefore the term "suspension" is used). These suspensions were applied by a nozzle applicator onto sheets of paper, board or transparency (300 μl of NDC solution on samples of 5×14 cm). Surface energy and strength, gloss and bending resistance were measured for the coated samples.

Figure 1:
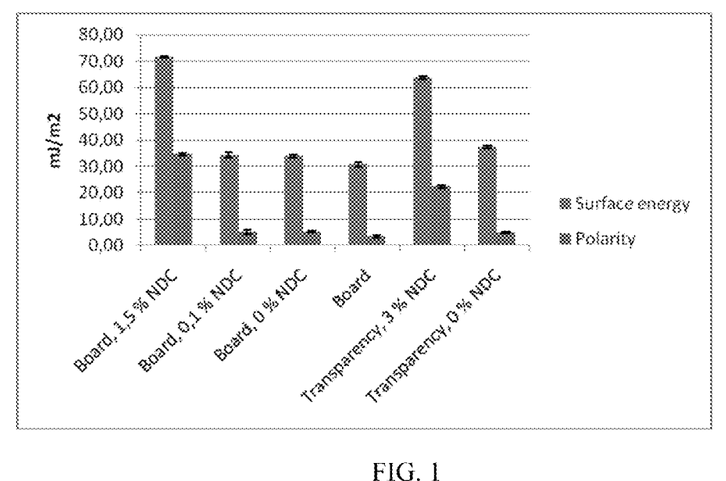
FIG. 1 shows surface energy and polarity for sheets of board or transparency onto which aqueous nanodisperse cellulose (NDC) suspensions of different nanocellulose concentrations have been disposed.
Figure 2:
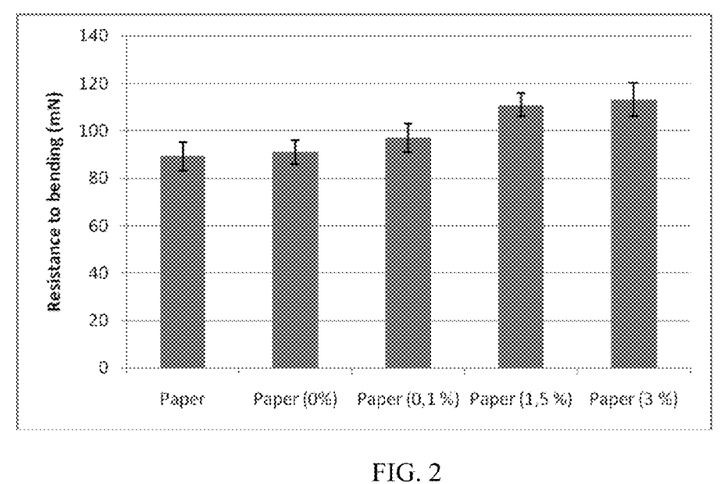
FIG. 2 shows bending resistance for sheets of paper onto which NDC suspensions of different nanocellulose concentrations have been disposed. The percentages refer to nanocellulose concentration.
Figure 3:
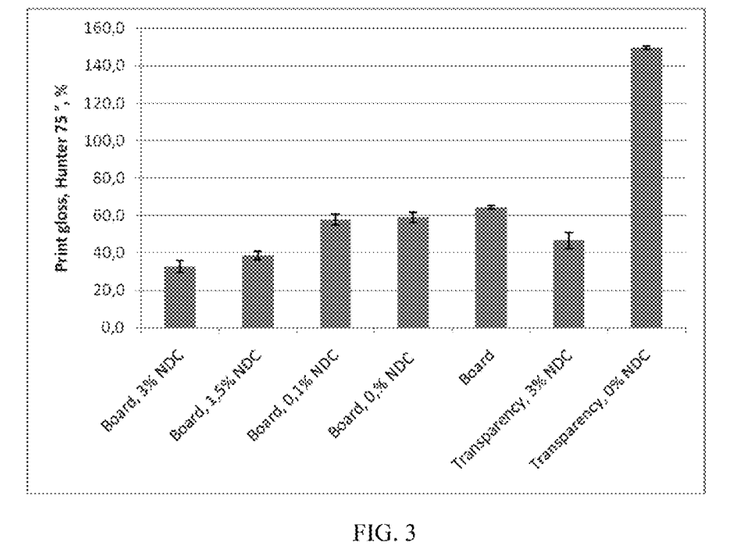
FIG. 3 shows print gloss for sheets of board or transparency onto which NDC suspensions of different nanocellulose concentrations have been disposed.

NDC formed a visible opaque (non-transparent) film on the surfaces of board and transparency. On paper sheets this effect was not observed because the NDC was probably adsorbed into the paper. As can be seen in FIG. 1, NDC increased surface energy and polarity for board and transparency. This means that application of the NDC suspension made the surfaces more hydrophilic. The measurement was performed as contact angle measurement for two liquids, i.e. water and di-iodomethane. In addition, NDC caused a slight increase in resistance to bending for paper as shown in FIG. 2. FIG. 3 shows that the gloss of board and transparency sheets decreases with increasing NDC concentrations.

No increase of surface strength was observed in these experiments, probably due to large particle size distribution of the nanocellulose in NDC. The high amount of added water supplied onto the surfaces may be another reason. Water typically weakens paper and board surfaces. Also the gloss decrease of paper and board may be a result of large particles in NDC which increase light scattering. With smaller NDC particles gloss may be higher and the strengthening effect more evident.

Example 3

Preparation of NDC Based Inkjet Ink Formulations a) General Requirements for Inkjet Ink Formulations Inkjet inks must be formulated to fit the physical and rheological requirements of fluid flow in the print head. The ink formulations require in particular certain particle size of the colorant pigment, and a certain viscosity and surface tension. These parameters depend on the printing head and the technique to be used. In this study, we have concentrated on the drop-on-demand technique.

Typically, the viscosity for ink formulations for drop-on-demand print heads should preferably be about 10-12 mPas at operating temperature. However, ink formulations having viscosities up to 30 mPas have been used for inkjet printing. The surface tension should preferable be in the range 28-33 mN/m although inks with a surface tension of up to 60 mN/m have been used. The particle size of the pigment should preferable be less than 1/100 of the size of the nozzle; i.e. if the diameter of the nozzle is 21.5 μm, then the diameter of the particle should be less than 0.2 μm. The ink should also have a low evaporation rate.

b) Study of the Influence of Addition of Various Solvents to the NDC Suspension

In order to prepare an NDC-based inkjet ink, the commercial NDC gel, which contains 10% of nanocellulose, was diluted in water to two suspensions containing 1.5 and 3%, respectively, of nanocellulose. To remove a fraction of large particles that might stuck the nozzles of the print head, the suspensions were centrifuged at 3000 rpm for 60 min. Coarse solid particles were withdrawn and the remaining liquid portion was used in the experiments. Thus, the nanocellulose content of the liquid portion used was in fact somewhat lower than 1.5 and 3%, respectively.

Next, in order to obtain desired "ink" viscosity and surface tension, mixtures of NDC suspensions and different solvent portions were made. Three polar solvents were used: isopropyl alcohol (IPA), polyethylene glycol (PEG) and ethylene glycol (EG).

Figure 4:
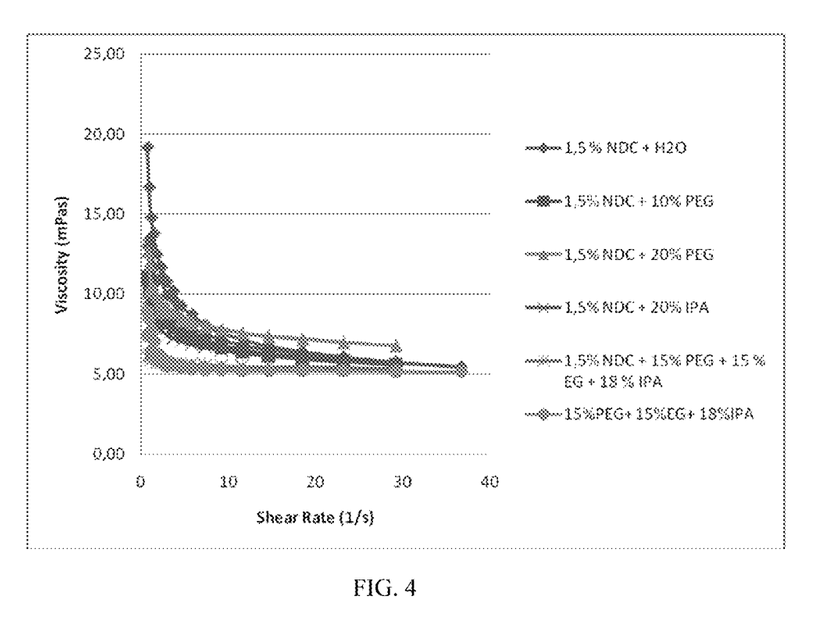
FIG. 4 shows viscosity versus shear rate for mixtures made by mixing one part of an aqueous NDC suspension containing about 1.5% of nanocellulose with one part of water or with one part of a mixture of polar solvents in water. A mixture of polar solvents in water without nanocellulose is also shown.
Figure 5:
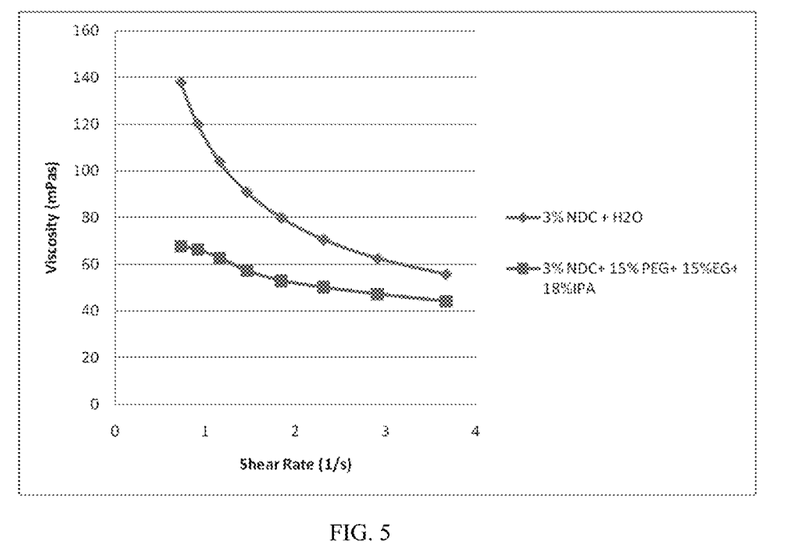
FIG. 5 shows viscosity versus shear rate for two mixtures made by mixing of one part of an aqueous NDC suspension containing about 3% of nanocellulose with one part of water or with one part of a mixture of polar solvents in water.
Figure 6:
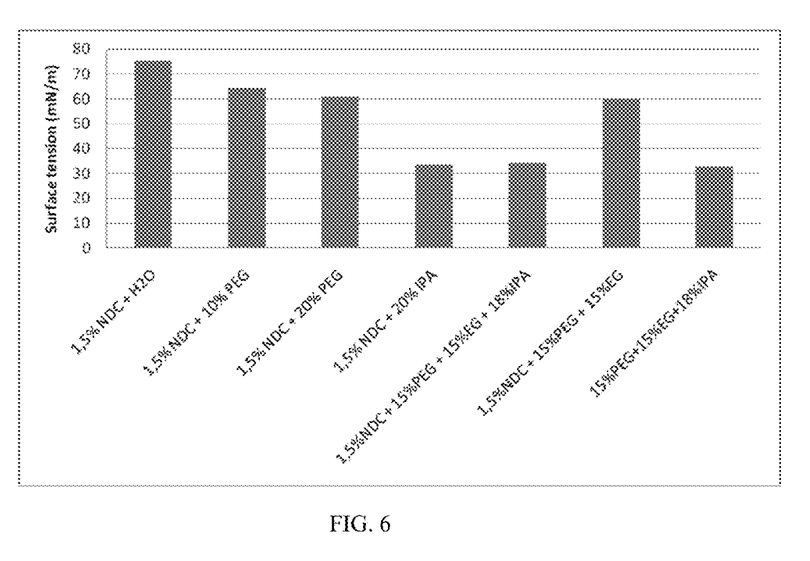
FIG. 6 shows surface tension for mixtures made by mixing one part of an aqueous NDC suspension containing about 1.5% of nanocellulose with one part of water or with one part of a mixture of polar solvents in water. A mixture of polar solvents in water without nanocellulose is shown as reference.

The effect of the addition of various amounts of polar solvents or water to the aqueous NDC suspension (which contains either about 1.5 or about 3% of nanocellulose) on the viscosity and surface tension of the mixture so obtained is shown in FIGS. 4 to 6. Viscosities were measured by Bohlin Vor viscometry and dynamic surface tension was measured by BPA (Bubble Pressure Analyzer). FIG. 4 shows viscosity as function of shear rate for different 1:1 mixtures made of the about 1.5% NDC aqueous suspension and water or polar solvents in water. It can be seen that the viscosities for share rates higher than 5 l/s are in the range 5 to 10 mPas. A reference mixture containing polar solvents in water with no NDC showed the lowest viscosity. All the NDC based mixtures shown in FIG. 4 have viscosities in the range suitable for inkjet printable fluids. FIG. 5 shows viscosity as function of share rate for 1:1 mixtures made of an approximately 3% aqueous suspension of NDC and either water or an aqueous mixture of the polar solvents IPA, PEG and EG. The measurements were difficult because the values did not stabilize as for the mixtures shown in FIG. 4. Nevertheless, FIG. 5 shows that the viscosity values are considerably higher for these mixtures (based on approximately 3% NDC suspension) than for the mixtures based on approximately 1.5% NDC suspension shown in FIG. 4.

FIG. 6 shows dynamic surface tension for various 1:1 mixtures of an approximately 1.5% NDC aqueous suspension and either water or various polar solvents in water. It can be noted that both PEG and IPA caused a reduced the surface tension, but IPA was clearly more effective. The mixtures containing IPA have appropriate surface tension values for use as inkjet printing fluids.

c) Formulations of Inkjettable Fluids

Based on the results shown in FIGS. 4-6 and known compositions for inkjet printing, four ink formulations were prepared: three ink formulations contained NDC (No. 1-3 in Table 1) and one (No. 4) contained polar solvents and water only. The ink formulations No. 1-2 were made by mixing one part of 1.5% NDC suspension with one part of a solvent mixture consisting of several individual components as indicated in the Table. Thus, for example the "NDC content 1.5" for ink No. 1 or 2 does not mean that that ink No. 1 or 2 contains 1.5% of nanocellulose. Instead it means that ink No. 1 or 2 is made of centrifuged 1.5% NDC suspension in combination with additional solvents. This means that the nanocellulose content of ink No. 1 or 2 is about 0.7%. Accordingly, the nanocellulose content of the ink formulation No. 3 is somewhat below 1.5%.

TABLE 1

|  | NDC content in original NDC solution | Additional solvents | Estimated viscosity | Surface tension (mN/m) |
| --- | --- | --- | --- | --- |
| Ink No. 1 | 1.5 | 15% PEG 15% EG 18% IPA 52% H$_2$O | 6 | 33.97 |
| Ink No. 2 | 1.5 | 20% IPA 80% H$_2$O | 7 | 33.35 |
| Ink No. 3 | 3.0 | 15% PEG 15% EG 18% IPA 52% H$_2$O | 44 | — |
| Ink No. 4 | 0 | 15% PEG 15% EG 18% IPA 52% H$_2$O | 5 | 32.86 | d) Test Printing with Inkjet Formulations

The ink formulations No. 1-4 were applied onto board or transparency by using a Dimatix Materials Printer (DMP) which is typically used as test device for experimental inkjet fluids. The nozzle diameter was 22.5 μm. The printer was equipped with a camera so that drop formation could be observed. Ink formulations No. 1-3 were printed by using a voltage of 40 V and ink No. 4 with 22 V.

Figure 7:
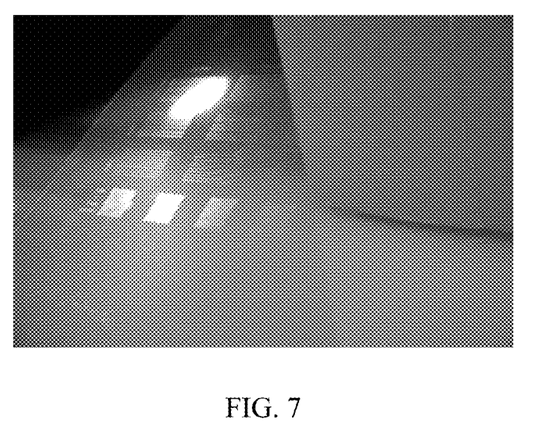
FIG. 7 shows opaque areas on a transparency sheet onto which a nanocellulose containing inkjettable fluid formulation has been disposed.

Ink formulations No. 1 and 4 were successfully printed. Ink No. 1 formed an opaque film on transparency (see FIG. 7) while ink No. 4, which contained no NDC formed a transparent film. Inks No. 2 and 3 were not successfully printed. Ink No. 3 had a clearly higher viscosity and this may be the reason for the failure. Ink No. 2 had good viscosity and surface tension values, but nevertheless it failed in printing. Typically glycols are used as solvents to improve inkjet printability of the fluid. Glycols have lower evaporation rate than IPA. The flow properties of glycols and IPA are also different.

CONCLUSIONS

Based on the tests described above, the solvents to be added to the NDC suspension are of great importance to give appropriate viscosity, surface tension and fluid flow of the ink formulation in the print head. Glycols worked best in the tests. Appropriate particle size of the nanocellulose fibres is important in order to avoid stuck of nozzles. In the experiments, the particle size distribution was obviously somewhat too large.

The required viscosity of the ink formulation sets a limit for the nanocellulose concentration. Ink formulations with nanocellulose concentrations of about 0.7% were printable, while formulations with about 1.5% of nanocellulose in the same amounts of polar solvents were not printable, obviously due to the high viscosity. In addition, the NDC particles may in higher concentrations interact and form agglomerates that stuck the nozzles. By selecting appropriate solvents and solvent portions to match the desired viscosity, higher nanocellulose concentrations could possibly be used in the ink formulations. In addition, the use of a proper surfactant, possibly a neutral surfactant, might reduce the surface tension and prevent agglomeration of the NDC particles.

It will be appreciated that the methods of the present invention can be incorporated in the form of a variety of embodiments, only a few of which are disclosed herein. It will be apparent for the expert skilled in the field that other embodiments exist. Thus, the described embodiments are illustrative and should not be construed as restrictive.

The invention claimed is:

1. A method for modification of the surface of a film-shaped body, which is either a fibre-containing sheet or a sheet made of a non-fibrous material, said method comprising: dispersing nano-sized polysaccharide fibre particles in a medium essentially composed of water and a polar solvent to form a suspension, applying the suspension onto said surface of a body by a printing method, and adjusting the fibre concentration of the suspension to adjust the viscosity of the suspension to a range that is suitable for said printing, and wherein the viscosity of the suspension, at a shear rate higher than 5 $s^{-1}$, is 5-200 mPas, wherein the surface of the sheet is modified to increase the strength properties or printability of the surface of the sheet.

2. The method according to claim 1, wherein the printing method is a non-contact method.

3. The method according to claim 1, wherein the printing method is a flexographic printing method.

4. The method according to claim 1, wherein the polysaccharide fibres have an average length of 200-1500 nm.

5. The method according to claim 1, wherein the polysaccharide fibres are nanocellulose fibres.

6. The method according to claim 1, wherein at least 20 wt-% of the medium is water and that the remaining portion of said medium is a polar solvent miscible with water.

7. The method according to claim 1, wherein the surface tension of the suspension is 20-60 mN/m.

8. The method according to claim 1, wherein the printing method is a flexographic printing method and the viscosity of the suspension is 10-200 mPas.

9. The method according to claim 1, wherein the printing method is an inkjet printing method and the viscosity of the suspension is 5-40 mPas.

10. The method according to claim 1, wherein the suspension is disposed onto one or more pre-determined area(s) on the surface of the body.

11. The method according to claim 10, wherein the suspension is disposed onto the predetermined area(s) of the surface as several layers.

12. The method according to claim 1, wherein the suspension is disposed onto the surface of the body as droplets, and wherein said droplets are either essentially uniform in size or of variable size.

* * * * *